Figure 1:
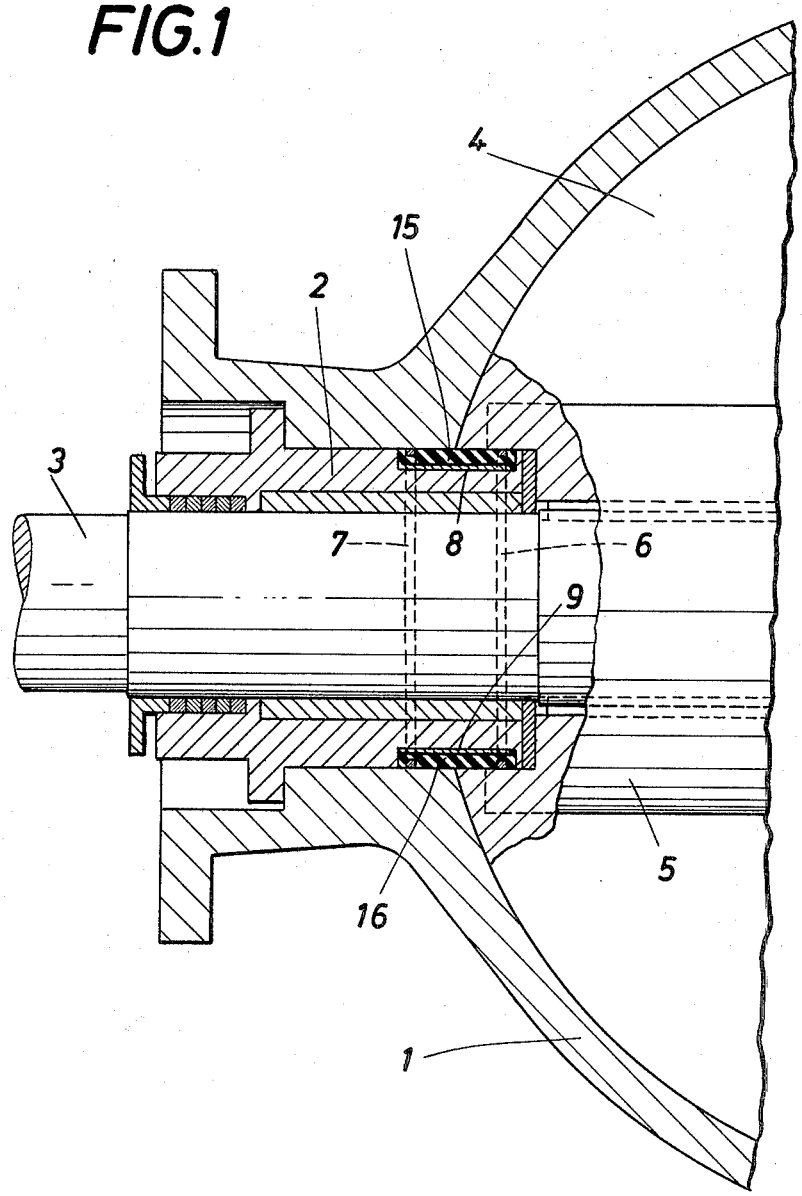

United States Patent [19]

Lukesch et al.

[11] 4,406,441
[45] Sep. 27, 1983

[54] BUTTERFLY VALVE

[75] Inventors: Norbert Lukesch, Linz; Josef Kapeller, Neufelden, both of Austria

[73] Assignee: Voest-Alpine Aktiengesellschaft, Linz, Austria

[21] Appl. No.: 330,717

[22] Filed: Dec. 14, 1981

[30] Foreign Application Priority Data

Jan. 14, 1981 [AT] Austria ................................. 109/81

[51] Int. Cl.$^3$ ............................................ F16K 31/44
[52] U.S. Cl. .................................... 251/214; 251/305; 277/165; 277/81 P
[58] Field of Search ....................... 251/305, 306, 214; 277/165, 81 P

[56] References Cited

U.S. PATENT DOCUMENTS 2,877,070 3/1959 Lee ...................................... 277/165
2,877,071 3/1959 Arnot .................................. 277/165

Primary Examiner—Martin P. Schwadron
Assistant Examiner—J. R. Shay
Attorney, Agent, or Firm—Kurt Kelman

[57] ABSTRACT

The valve disk of a butterfly valve is carried by a valve shaft, which is mounted in bearing bushings, which are fitted in the valve body. Each bearing bushing is formed in its outside peripheral surface with two peripheral grooves and between said grooves with diametrically opposite grooves for receiving sealing rings and axial sealing strips, respectively. The inner peripheral groove is disposed adjacent to the valve body. The outer peripheral groove is adjacent to the hub of the valve disk. Said hub surrounds the adjacent bearing bushing at its end protruding into the interior of the valve body. The two axial grooves register with the valve disk when the same is closed. To ensure a long life and a permanently tight seal, the outer peripheral groove contains two superimposed sealing rings. The upper one of said superimposed sealing rings consists of a polytetrafluoroethylene strip, which is narrower than the peripheral groove and has free ends which abut and define an oblique joint.

5 Claims, 4 Drawing Figures

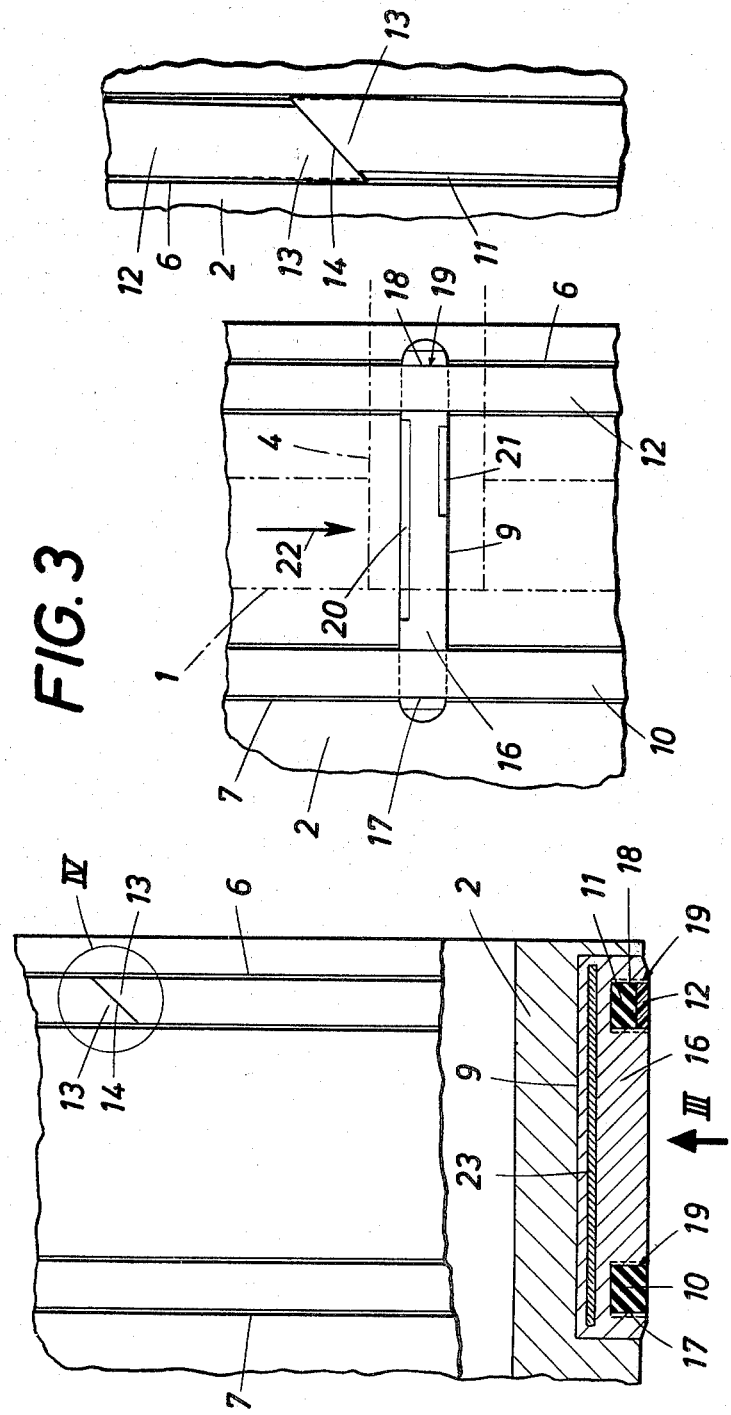

BUTTERFLY VALVE

This invention relates to a butterfly valve comprising a valve body, bearing bushings fitted in said valve body, a valve shaft rotatably mounted in said bearing bushings, and a valve disk fixed to said shaft. Each of said bearing bushings is formed on its outside peripheral surface with two peripheral grooves and between the latter with two diametrically opposite axial grooves for receiving sealing rings and sealing strips, respectively. The inner peripheral groove is disposed adjacent to the valve body. The outer peripheral groove is disposed adjacent to the hub of the valve disk. That hub surrounds that end of the bearing bushing that protrudes into the interior of the valve body. The two axial grooves register with the valve disk when the latter is in a closed position.

Butterfly valves are used in pipelines and turbine installations as safety or control valves, which are actuated by hydraulic or mechanical means or by gravity. Particularly with large butterfly valves, the requirement for axial and radial seals and the fact that the pressure distribution depends on the position of the valve disk and is not centrally symmetrical in certain positions of the valve disk give rise to difficulties as regards the seal between the valve disk, the valve body and the bearings for the valve shaft. A tight seal at said bearings is essential for the tightness of the valve. To provide such seal it is known to form each of the bearing bushings for the valve shaft with two peripheral grooves for receiving sealing rings. One of said grooves serves to seal the bearing bushing against the valve body. The other of said grooves serves to seal the bearing bushing against the hub of the valve disk. These two peripheral grooves are connected to each other by two axial grooves, which lie in the axial plane that is defined by the valve disk when the latter is in its closed position and which contain sealing strips. When such valve is closed, the sealing rings in the peripheral grooves virtually supplement the axial seal between the disk and the bearing bushings provided by the sealing strips and limit the area of that critical seal. Simple sealing rings and sealing strips made of rubber which is reinforced with woven fabric have previously been used in the grooves of the bearing bushings so that the high coefficient of friction between said sealing material and the material of the sealing element carried by the valve disk or the metal of the valve disk permits fluid to enter the bearing and to flow in a transverse direction to the closed valve disk when the sealing elements are only slightly oversize. Such leakage is particularly large during the actuation of the valve owing to the inevitable clearances between the shaft and the bearings. On the other hand, if the oversize of the sealing elements is sufficient to prevent leakage, the sealing elements will be squeezed and destroyed too soon; they will stick together when the valve has not been actuated for a long time; and a large force will be required to actuate the valve so that large actuating means are required and, for instance, check valves cannot be actuated by gravity.

It is an object of the invention to eliminate these disadvantages and to provide a butterfly valve which is of the kind described first hereinbefore and which has a long life and requires servicing only after long intervals of time and distinguishes in that it is permanently tight and can be actuated by a small force.

This object is accomplished according to the invention in that the outer peripheral groove contains two superimposed sealing rings and the upper one of said sealing rings consists of a strip of polytetrafluoroethylene or another lubricating solid plastic material and is narrower than the outer peripheral groove in which it is contained and has free ends which abut and define a joint that extends obliquely to the peripheral direction. As there is no relative movement between the bearing bushing and the valve body, no difficulty is involved in the provision of the seal between the bearing bushing and the valve body and that seal may be provided by conventional sealing rings, e.g., of rubber or another suitable elastomer, which are contained in the corresponding inner peripheral groove of the bearing bushing. In order to provide the desired seal also between the bearing bushing and the valve disk, the outer peripheral groove contains a closed lower sealing ring consisting of rubber or another suitable elastomer, and a second sealing ring which is loosely applied to the lower sealing ring and consists of polytetrafluoroethylene or a material having similar properties, i.e., a material which has a low coefficient of friction even under high contact pressure. As the second sealing ring is narrower than the groove and the ends of the second sealing ring define an oblique joint, the ends of the strip which define the joint can be shifted laterally so that the strip which is closed to form the sealing ring can adapt itself to changes in length without causing the joint to gape and permit leakage. The combination of the strip of polytetrafluoroethylene and the underlying sealing ring thus results in a seal which has a low coefficient of friction and which can yield radially by more than the clearance between the shaft and the bearing and which is always forced outwardly by a constant force, always is in uniform contact with the sealing surfaces, regardless of length changes, and always ensures absolute tightness.

In accordance with a preferred further feature of the invention the axial grooves extend beyond the peripheral grooves and at the crossings of the axial and peripheral grooves the sealing strips contained in the axial grooves have recesses through which the sealing rings extend without a clearance. The crossing of the sealing ring and sealing strip ensures a tightly sealed joint between the axial and peripheral sealing elements so that there will be no leakage in that region when the valve disk is closed. The recess in the sealing strip also retains the loose strip of polytetrafluoroethylene and will reliably prevent a shifting of said strip in the peripheral direction. On the other hand, a length adjustment of said strip is permitted by the lateral clearance between the strip and the peripheral groove of the bearing bushing. A shifting of the loose strip in the peripheral direction must be prevented because the joint formed by the ends of said strip must not enter the crossing, where said joint would permit leakage.

Within the scope of the invention it will also be desirable to provide the axial sealing strips with chamfers at their axial edges which are in contact with the hub of the valve disk and are adapted to contact other portions of the valve disk. During the movement of the valve disk, the edge of said disk wipes over the edges of the axial sealing strips shortly before it reaches the closed position and these chamfers ensure that the axial sealing strip will not be squeezed during that movement so that its life will be prolonged and the axial sealing strips will be safely held in position in the axial grooves, as is essential for the tight seal at the crossing of the axial sealing strips and sealing rings.

The axial sealing strips can be held even more firmly in position in the axial grooves and will be as stiff as is required for fluids under high pressure if each axial sealing strip has a steel core.

An embodiment of the invention is shown diagrammatically and by way of example on the drawing, in which;

FIG. 1 is an axial sectional view showing part of a butterfly valve according to the invention, FIG. 2 is an elevation, partly in section, showing the bearing bushing of said butterfly valve on a larger scale, FIG. 3 is an elevation showing the valve as viewed in the direction of the arrow III in FIG. 2, and FIG. 4 is an enlarged view showing the detail IV of FIG. 2.

A bearing bushing 2 is fitted in a valve body 1 of a butterfly valve. A valve shaft 3 is rotatably mounted in the bushing 2 and carries a valve disk 4, the hub 5 of which is non-rotatably mounted on the shaft 3. The valve disk 4 can be pivotally moved by the shaft 3. The bearing bushing 2 extends into the interior of the valve housing 1 and is embraced by the hub 5 of the valve disk 4. The region between the valve body 1, the bearing bushing 2 and the hub 5 and other portions of the valve disk 4 is critical for the tightness of the valve. As is apparent from FIG. 3 where the valve disk 4 is shown in dotted lines in its closed position, a pressure difference is built up between opposite sides of the valve disk 4 when the valve is closed. That pressure difference may give rise to a leakage flow between the valve disk 4 and the bearing bushing 2. Sealing means are required to take up that pressure difference in a peripheral direction and to seal the bearing from the fluid. To permit a seal which satisfactorily meets these requirements, the bearing bushing 2 is formed with an outer peripheral groove 6 and an inner peripheral groove 7, which are interconnected by two diametrically opposite axial grooves 8, 9, which register with the valve disk 4 when it is closed. The peripheral groove 7 contains a conventional sealing ring 10 of rubber or the like material. That seal is not problematic because there is no relative movement between the valve body 1 and the bearing bushing 2. The outer peripheral groove 6 is provided for the seal between parts which move relative to each other, namely, the bearing bushing 2 and the hub 5 of the valve disk 4 and contains two superimposed sealing rings 11 and 12. The lower sealing ring 11 consists of a conventional ring of rubber or another suitable elastomeric material. The upper sealing ring 12 consists of a strip of polytetrafluoroethylene and lies loosely on the rubber ring 11 and has free ends 13, which abut and define a joint 14 that is oblique to the peripheral direction. That strip of polytetrafluoroethylene and the rubber ring 11 are not connected to each other and both are smaller in width than the groove 6. As a result, the ends 13 of the strip can be laterally shifted, as is indicated in FIG. 4, and permit an adaptation in length without a gaping of and leakage through the joint 14. The rubber ring 11 can expand laterally under radial load.

Axial sealing strips 15, 16 are immovably fitted in the axial grooves 8, 9 and provide a seal between the bearing bushing 2 and the valve disk 4 when the latter is closed. At their crossings with the peripheral grooves 6, 7, these axial sealing strips 15, 16 are formed with recesses 17, 18, through which the sealing rings 10, 11, 12 extend and in which the polytetrafluoroethylene strip which forms the sealing ring 12 is held at 19 without backlash. Owing to this absence of backlash, a tight seal is ensured at the crossings of the axial sealing strips 15, 16 with the sealing ring 10 and with the sealing rings 11, 12 and a shifting of the sealing ring 12 in the peripheral direction is prevented whereas a length adjustment of the sealing ring 12 will be permitted by the lateral clearances between the polytetrafluoroethylene strip and the peripheral groove 6.

To reliably ensure a tight seal at these crossings, the axial sealing strips 15, 16 must be immovably held in position in the axial grooves 8, 9 even when the edge of the valve disk 4 during its closing movement wipes over the axial sealing strips shortly before it reaches the closed position. In order to prevent a squeezing of the axial sealing strips during that wiping contact and yet to ensure that the axial sealing strips will be held in position, the axial sealing strips 15, 16 are formed with chamfers 20, 21. The chamfer 20, which is contacted by the edge of the valve disk during its closing movement, indicated by the arrow 22 in FIG. 3, has an adequate length, and the chamfer 21 which is disposed on the other side and cooperates only with the hub 5 is correspondingly shorter. The axial sealing strips 15, 16 may be stiffened by a steel core 23, which improves the tighness under higher pressures as well as the fixation of the axial sealing strips in the axial grooves 8, 9.

What is claimed is:

1. In a butterfly valve comprising
   a valve body defining an interior cavity, which constitutes a flow passage,
   two axially aligned bearing bushings fitted in said valve body on opposite sides thereof and protruding into said cavity, each of said bearing bushings having an outside peripheral surface formed with a first peripheral groove, which faces said valve body, with a second peripheral groove, which is axially spaced apart from said first peripheral groove and extends in said cavity, and with two diametrically opposite axial grooves connecting said peripheral grooves,
   a valve shaft extending through said cavity and rotatably mounted in said bearing bushings,
   a valve disk disposed in said cavity and movable into and out of a closed position in which said valve disk registers with said axial grooves, said valve disk having a hub which is non-rotatably mounted on said valve shaft and surrounds each of said bearing bushing inside said cavity,
   first annular sealing means contained in said first peripheral groove and in sealing contact with said valve body,
   second annular sealing means contained in said second peripheral groove and in sealing contact with said hub, and
   two axial sealing strips contained in respective ones of said axial grooves and in sealing contact with said hub and arranged to be in sealing contact with edge portions of said valve disk when said valve disk is in said closed position,
   the improvement residing in that
   said second annular sealing means comprise a radially inner sealing ring and a radially outer sealing ring, which protrudes from said second peripheral groove and consists of a strip of a lubricating solid plastic material, which strip is narrower than said second peripheral groove and laterally movable relative thereto and has free ends which abut each other and form a joint that is oblique to the peripheral direction of the bushing.

2. The improvement set forth in claim 1, wherein said lubricating solid plastic material is polytetrafluoroethylene.

3. The improvement set forth in claim 1, wherein said axial grooves extend beyond said peripheral groove and form crossings with said peripheral grooves, said axial sealing strips have recesses which are register with said peripheral grooves at said crossings, and said first annular sealing means and said radially inner and radially outer sealing rings extend through said recesses without backlash.

4. The improvement set forth in claim 1, wherein said valve disk protrudes axially beyond said hub and each of said axial sealing strips has a first chamfered edge portion contacting said hub and a second chamfered axial edge portion which is arranged to be contacted by an edge portion of said valve disk during the movement of said valve disk to said closed position.

5. The improvement set forth in claim 1, wherein each of said axial sealing strips has a steel core.

* * * * *